Figure 1:
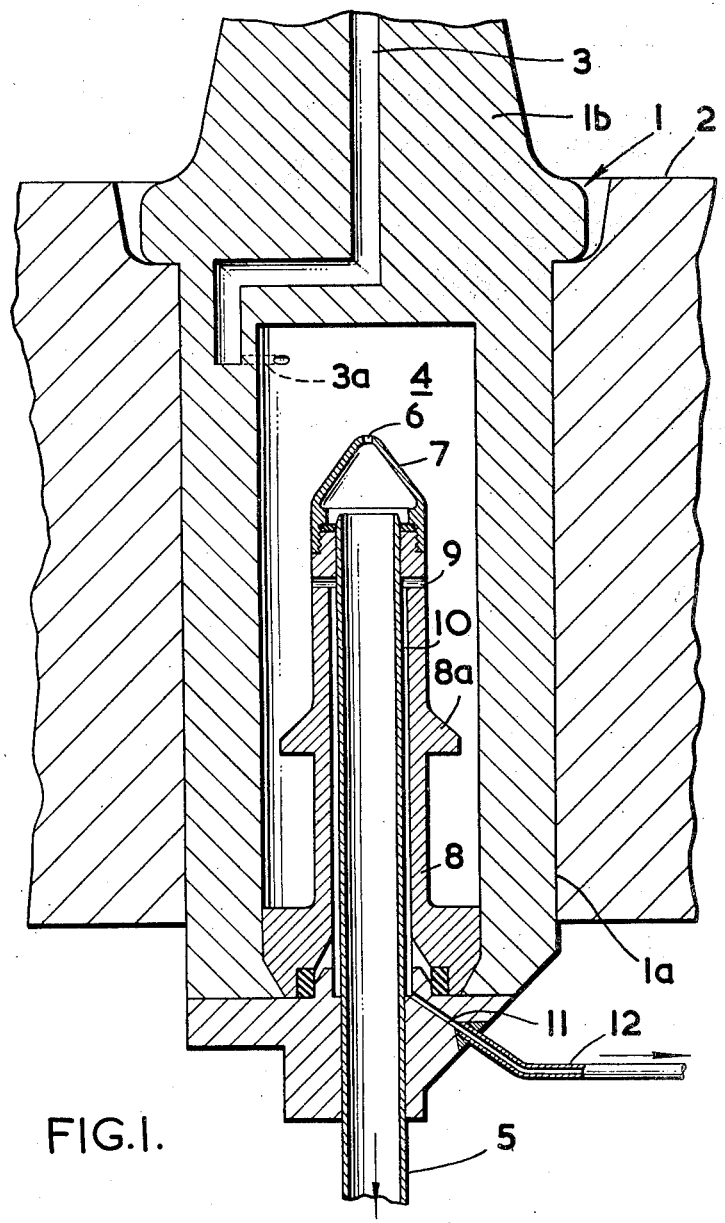

FIG.I.

United States Patent Office 3,196,083
Patented July 20, 1965

3,196,083
HIGH TEMPERATURE REACTORS
Samuel Brittan Hosegood, Weymouth, Dorset, Bernard William Collins and Cecil Harper, Dorchester, Dorset, and Geoffrey Winton Horsley, Preston, Weymouth, Dorset, England, assignors to United Kingdom Atomic Energy Authority, London, England
Filed Dec. 4, 1961, Ser. No. 156,812
Claims priority, application Great Britain, Dec. 9, 1960, 42,572/60
9 Claims. (Cl. 176—37)

This invention relates to high temperature gas cooled nuclear reactors, in which means are provided for withdrawing volatile fission products from the reactor fuel components in the reactor core by means of a so-called purge gas stream of coolant gas which is drawn through the fuel elements and into the fuel element mounting and may then be passed to a purification plant. Thereafter cleaned gas may be returned to join the main bulk of reactor coolant. The invention is chiefly concerned with a nuclear reactor of the kind described in the First Annual Report of the O.E.E.C. High Temperature Gas Cooled Reactor Project of July, 1960. An arrangement is envisaged therefore wherein a number of purge gas streams possibly containing gaseous fission products are withdrawn throughout from separate fuel element components or assemblies into their mountings and led through pipes, connected to a fission product purification and/or sampling plant. In the event of inadvertent leakage into any one of the purge gas streams of coolant gas within the reactor, due for example to one fuel element being badly seated on its mounting a serious disturbance of the flow conditions could result.

The present proposal is to incorporate a means effective to produce a flow restriction into each purge gas flow line so that should such a leakage occur in any one fuel component then the other purge flows are maintained close to their correct volumes.

The flow restriction in the purge gas stream between the fuel component and the purification plant may be effected by passing the purge gas through a pressure-throttling orifice. However, it is not unlikely that an orifice of a size small enough to give an effective flow restriction in the gas stream would become obstructed by solid particles which may be entrained in the purge gas stream during its passage through the fuel component or reactor core.

According to the present invention, a gas cooled nuclear reactor has a core containing a number of separate flow paths for gas, ducts communicating said flow paths with a flow restricting orifice and means in said ducts for separating solid particles from the gas upstream of said orifice. The orifice is preferably formed at the end of a pipe which is concentric with the axis of a cyclone separation chamber and extends from the base of the chamber so as to define an annular space within which suspended solids can accumulate.

It is required that a sample of the purge gas be taken from to time to allow the degree of its contamination by fission products, etc., to be determined.

Accordingly, it is preferred to employ a double walled pipe having an annular space between the walls which communicates the interior of the cyclone separation chamber with a sampling duct along which a sampling flow may be withdrawn.

Figure 2:
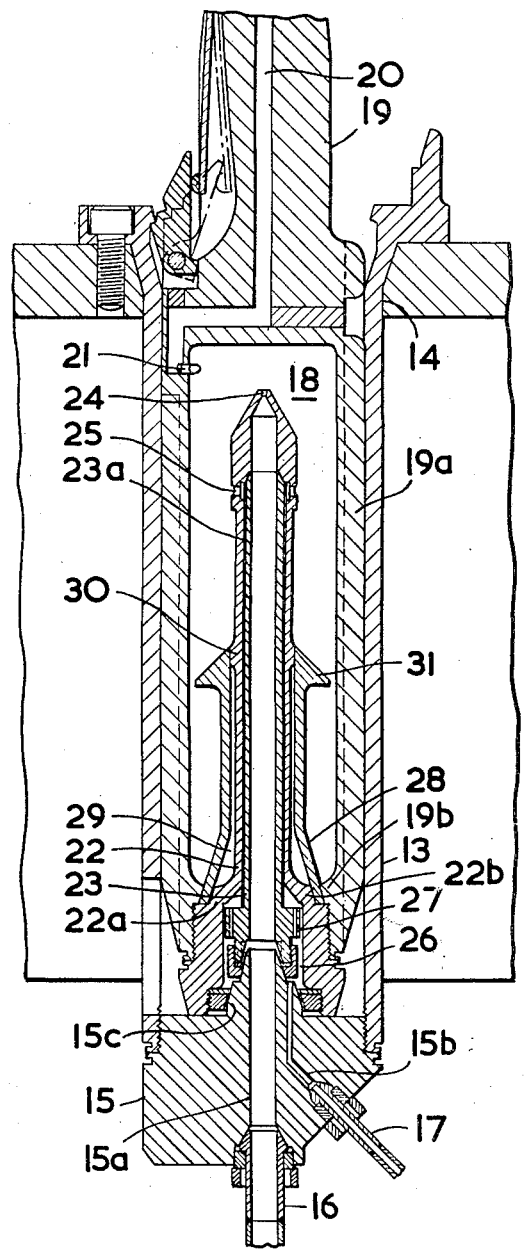

The invention will now be described with reference to the accompanying diagrammatic drawings in which FIG. 1 shows an axial cross-section through part of a fuel element mounting and FIG. 2 shows a modified form of the mounting shown in FIG. 1.

Referring to FIG. 1, the fuel element mounting 1 comprises a base part 1a which is supported in a grid plate 2 and a fuel element mounting part 1b extending upwardly from the base 1a into the reactor core where, in use, it supports a cluster of fuel elements (not shown). Each fuel element is of the kind having nuclear fissile material supported on a graphite spine and enclosed by a cylindrical fuel box of graphite. The fuel box is closed at its upper end by a porous plug whilst a port in its lower end communicates the annular space between the fissile material and the fuel box with a manifold in a coned seating member which locates the element on the mounting part 1b. A bore 3 in the part 1b communicates at its upper end with the manifold and at its lower end with a chamber 4 within the base part 1a of the mounting spike 1. An outlet pipe 5 communicates the interior of the chamber 4 with a fission product purification plant. Purge gas flow is induced through the system by a pump located on the downstream side of the purification plant.

In order to introduce a pressure drop in the purge gas flow path upstream of the purification plant, a flow restricting orifice 6 is located in the chamber 4 and to avoid blockage of this orifice the chamber 4 is designed as a cyclone chamber.

To this end the bore 3 is arranged to communicate with the chamber 4 through a hole 3a drilled tangentially to the upper part of the wall of the chamber 4 such that purge gas will enter the chamber with a swirling motion about the chamber axis.

The outlet pipe 5 enters the chamber 4 from its lower end and extends co-axially within the chamber and terminates near the upper end thereof. The orifice 6 is formed in a cone shaped cap 7 which fits over the terminal part of the pipe 5 within the chamber and is supported by a sleeve 8 mounted in the base of chamber 4 and extending co-axially of the pipe 5. An external shoulder 8a having a conical upper surface is formed on the sleeve 8 at a region about midway along its length.

Between the shoulder 8a and the cap 7 the sleeve 8 has a series of radial ports 9 which communicate the chamber 4 with an annular clearance 10 which is formed between the sleeve 8 and the pipe 5 and which extends axially from the ports 9 downwards to the base of the chamber 4.

A hole 11 drilled through the chamber base communicates the clearance with a sampling pipe 12. The latter is connected to a sampling valve (not shown).

In operation a stream of purge gas is drawn through hole 3a into the chamber 4 with a swirling motion. The denser solid particles are centrifuged outwards towards the inner face of the wall of the chamber 4 whilst the substantially particle-free gas passes through the orifice 6 into and through outlet pipe 5 by which it leaves the chamber 4. The remaining, particle-containing, gas is swirled within the chamber 4 the particles falling into the lower part of the chamber where they are trapped against re-entrainment by the shoulder 8a.

When a sample of the purge gas is required, this is drawn from the annular space between the sleeve 8 and the chamber wall through the ports 9, annular clearance 10, hole 11 and sampling pipe 12. The latter may be connected to a sampling system as disclosed by our copending British patent application No. 42571/60.

In a modified form of the embodiment previously described (shown in FIG. 2) the chamber assembly is located within a sleeve 13 which is secured within a grid aperture 14, the sleeve 13 being closed at its lower end by a plug 15 having an axial passage 15a and a small diameter bore 15b. A fixed pipe 16 enters the power end of the passage 15a which it communicates with a fission product purge gas purification plant (not shown). Sampling pipe 17 communicates the lower end of bore 15b with a sampling line (not shown). The passage 15a and the bore 15b extend through a central boss 15c formed concentric with the plug 15. The cyclone chamber 18 is formed within the base part 19a of the fuel element support spike 19, the part 19a being a push fit within the sleeve 13. The spike 19 has an axial bore 20 communicating the purge gas flow channels in the fuel elements with the cyclone chamber 18 by way of tangential port 21 formed in the chamber wall in a similar manner to the arrangement in FIG. 1.

Mounted on the central boss 15c are the enlarged ends of two concentric tubes 22, 23 which extend axially within the chamber 18, the outer tube 22 terminating at its upper end in an orifice 24 near the upper end of the chamber 18 whilst its lower enlarged end has a shoulder at 22a to close the base of the chamber 18.

The upper terminal portion of the tube 23 is screwed into the outer tube 22 below the orifice 24 and longitudinal grooves 23a in its outer surface provide axial passageways between these concentric tubes. At their upper ends these passageways communicate with the interior of the chamber 18 by way of ports 25 in the tube 22 whilst at their lower ends they communicate with the small diameter bore 15b, by way of passages 26 and 27.

The enlarged lower end portion of tube 22 is conically stepped at 22b opposite to a complementarily stepped reentrant portion 19b of the base part 19a. The shoulder 22a of the tube 22 serves to space apart the conically stepped portions 22b, 19b so that the intervening space provides an annular mounting for the conically flared end of a sleeve 28 of ceramic, or other heat resistant, material and to support it in spaced relation around the outer tube 22 thereby to define a head insulating space 29.

The upper end of sleeve 28 is supported by a shoulder 30 formed on the tube 22. The periphery of sleeve 28 is formed with a conical baffle 31 corresponding in form and function to the shoulder 8a referred to in FIG. 1.

The operation of the arrangement shown in FIG. 2 is similar to that described with reference to FIG. 1, but has constructional advantages in that the tube 22 is effectively heat insulated by the sleeve 28 which may be subjected to very high temperatures due to the deposition thereon of fission products. Additionally, should it be a requirement for the cyclone chamber assembly to be withdrawn from the supporting grid, the construction shown in FIG. 2 allows the pipe 22 to be withdrawn together with the rest of the assembly whereas in FIG. 1 the corresponding pipe 5 is attached to a fixed part of the structure.

We claim:

1. In a nuclear reactor having at least one removable core component, a grid plate, a mounting for said component, said mounting having an internal flowpath for gas, said flowpath containing a solid particle separating means for separation of solid particles from gas in said flowpath, and a flow restricting orifice arranged in that order in the direction of flow, and means releasably retaining the mounting in the grid plate.

2. In a nuclear reactor having at least one removable core component, nuclear fuel material contained in said core component, a mounting supporting said component, said mounting having an internal flow path for reactor coolant gas, a flow restricting orifice in said flow path to create a pressure drop in reactor coolant gas flow in said flow path and separating means in said flow path to physically separate solid particles from gas upstream of the orifice.

3. A nuclear reactor as claimed in claim 2 including means for leading off a sample of the gas in flow path upstream of said orifice.

4. A mounting in a nuclear reactor as claimed in claim 2 wherein said separating means comprises a cyclone separating chamber within said mounting, an inlet arranged to admit gas to said chamber and wherein said orifice comprises an outlet for said chamber.

5. A mounting in a nuclear reactor as claimed in claim 2 wherein said separating means comprises an inner hollow region of cylindrical form and inlet means to introduce reactor coolant gas tangentially to a cylindrical wall of said region and wherein said orifice forms an outlet for reactor gas coolant flow from said region.

6. In a nuclear reactor having at least one removable core component, a mounting for said component, said mounting having an internal flow path for gas, a flow restricting orifice in said flow path, means within the flow path for separating solid particles from the gas upstream of the orifice, said means comprising an inner hollow region within said mounting of cylindrical form, an inlet directed tangentially with respect to said hollow region and communicating the gas flow path with said region, a pipe extending axially within said inner hollow cylindrical region and terminating in a flow restricting orifice near said inlet.

7. A mounting in a nuclear reactor as claimed in claim 6 wherein said pipe is a double walled pipe.

8. A mounting in a nuclear reactor as claimed in claim 7 including a sampling port communicating the annular region formed by said double walled pipe with a sampling point remote from said mounting.

9. A mounting in a nuclear reactor as claimed in claim 7 wherein the outer wall of said double walled pipe includes a baffle extending radially into said cylindrical chamber.

References Cited by the Examiner

UNITED STATES PATENTS

| 2,877,170 | 3/59 | Greenhalgh et al. | 176—87 |
| 2,987,459 | 6/61 | Labeyrie et al. | 176—19 |
| 3,060,111 | 10/62 | Sherman et al. | 176—18 |

OTHER REFERENCES

Goupil et al., German Printed Application No. 1,087,719, 8/60.

REUBEN EPSTEIN, *Acting Primary Examiner.*
CARL D. QUARFORTH, *Examiner.*